United States Patent [19]

Uchida

[11] Patent Number: 5,210,876

[45] Date of Patent: May 11, 1993

[54] METHOD FOR CALLING INTERPRETER LANGUAGE PROCEDURE FROM COMPILER LANGUAGE PROCEDURE

[75] Inventor: Seiji Uchida, Tokyo, Japan

[73] Assignee: NEC Corporation, Tokyo, Japan

[21] Appl. No.: 361,056

[22] Filed: Jun. 5, 1989

[30] Foreign Application Priority Data

Jun. 6, 1988 [JP] Japan .............................. 63-137397

[51] Int. Cl.$^5$ .............................................. G06F 9/45
[52] U.S. Cl. .................................. 395/700; 395/650;
364/DIG. 1; 364/280; 364/280.4
[58] Field of Search ... 364/200 MS File, 900 MS File;
395/700, 650, 500

[56] References Cited

U.S. PATENT DOCUMENTS

| | | | |
|---|---|---|---|
| 4,736,321 | 4/1988 | Brown et al. | 395/650 |
| 4,787,034 | 11/1988 | Szoke | 395/425 |
| 4,949,255 | 8/1990 | Gerth et al. | 395/725 |

OTHER PUBLICATIONS

"Bits and Pieces, Programming Techniques," vol. 4, 1979-Byte Publications, Inc., *Linking and Loading* by Harry Tennant, pp. 77-87.

*Primary Examiner*—Paul V. Kulik
*Attorney, Agent, or Firm*—Foley & Lardner

[57] ABSTRACT

For calling interpreter language procedure from a compiler language procedure, a compiler language procedure is generated in accordance with a function name of the interpreter function, a name of the foreign language procedure for calling the interpreter function, a return data type name of the interpreter function and an argument data type name and storing the compiler language procedure into a main memory. An external name registration table is then generated, containing data for addressing the foreign language procedure. A dynamic linking means is operable in response to the generation of the external name registration table for reading an object file from an auxiliary memory and the contents of the external name registration table and establishing reference relationships between the foreign language procedure and other procedures in accordance with the external name registration table and storing the foreign language procedure and the other procedures into the main memory so that the foreign language procedure can be used to call the interpreter function by way of the compiler language procedure. An interpreter language procedure for operating the foreign language procedure is generated and stored into the main memory.

1 Claim, 5 Drawing Sheets

METHOD FOR CALLING INTERPRETER LANGUAGE PROCEDURE FROM COMPILER LANGUAGE PROCEDURE

BACKGROUND OF THE INVENTION

The present invention relates generally to methods for linking different computer languages, and more specifically to a method for calling an interpreter language procedure from a compiler language procedure.

In computer programming it is the usual practice to call procedures described in an interpreter language such as C language from procedures described in a compiler language such as Lisp in order to utilize user's existing compiler-language libraries or modules in an interpreter-language environment or take full advantage of different languages when describing a high-speed computation program in FORTRAN. In this foreign language call, two types of user interface are available. With the first type, the interface uniquely assigns a function to a particular foreign language when the latter is called and receives a return value if there is one. This method is extensively used for operating systems in which foreign language procedures are dynamically linked. Although satisfactory for implementers, this method shifts the burden of programming to the user's side by frequent needs to use unnatural descriptive codes. The second type of interface is one in which the user is requested to identify the type of a foreign language to be called and the types of arguments and return values. The latter represents a more natural way of foreign language calling than the former and has met with a wide reception for calling a foreign language procedure from within an interpreter language procedure.

With the aforementioned foreign language calling methods, arguments are passed to a foreign language procedure to invoke some actions and return values are received, with all the steps involved being run in a closed loop within the foreign language procedure.

In order to increase the flexibility of processing and to realize high-level utilization of computer programs, proposals have been made to call an interpreter language procedure from within a foreign language procedure which has been called from that interpreter language. As with the current foreign language call, two types of user interface are available for calling a function described in an interpreter language. With the first type of the proposed interface, a compiler language procedure is available for users to call interpreter language functions. With the second type of such user interface, the user in his own foreign language procedure describes a reference to an interpreter language function as if it were described in a compiler language, defines the interpreter language function before the foreign language procedure is dynamically linked within the interpreter, and identifies the type of the foreign language to be called and the types of arguments and return values.

One example that implements the first type of the proposed user interface is a function lisp-call (index, arg1, arg2, . . . , argn) which is provided by a Lisp processing system to allow it to be called by a C-language processing system. The index is the identification of an element in a listing (address table) of addresses of the Lisp functions to be called and the arguments are ones which will be passed to the Lisp functions. The user is instructed to use the lisp-call function to describe a C-language function to call a Lisp function in a compiler and then invoke the Lisp and dynamically solve the references in object files obtained by the compilation. This dynamic linking is done by the use of a process which dynamically calls a static linker provided by an operating system. The user then defines the Lisp functions to be called by the lisp-call function and stores their addresses into the address table. The identification of an element in the address table is passed as an argument to the called foreign language procedure to derive a function address listing corresponding to the address table. One disadvantage of this interface is that the user is always required to use the interpreter function which is the only channel, or window through which a foreign language call is established. Another disadvantage is that the user must be constantly aware of the internal states of the interpreter since the first argument of the window function is an element identifier of a management list of the interpreter.

The second type of the proposed user interface is implemented by a Lisp function define-foreign-entry in which are given the storage area name of the foreign language procedure that references to the Lisp function, arguments and return values. By performing a dynamic linking, the Lisp function is called from a foreign language procedure using the same function name. Since the storage area name of the foreign language procedure must be provided to make reference to the Lisp function to execute the define-foreign-entry function, the user must be constantly aware of the storage area of the foreign language procedure when using various functions. Another disadvantage is that a substantial amount of overheads is needed for management of storage areas.

SUMMARY OF THE INVENTION

It is therefore an object of the present invention to provide a technique for calling an interpreter language procedure from a compiler language procedure which overcomes the prior art problems.

According to the present invention, there is provided an interpreter system which comprises a main memory for storing an interpreter function, and an auxiliary memory for storing an object file containing a foreign language procedure and a plurality of other procedures. Compiler language procedure generating means is coupled to the main memory for generating a compiler language procedure in accordance with a function name of the interpreter function, a name of the foreign language procedure for calling the interpreter function, a return data type name of the interpreter function and an argument data type name and storing the compiler language procedure into the main memory. An external name registration means is operable in response to the generation of the compiler language procedure for generating an external name registration table containing data for addressing the foreign language procedure. A dynamic linking means is operable in response to the generation of the external name registration table for reading the object file from the auxiliary memory and the contents of the external name registration table and establishing reference relationships between the foreign language procedure and the plural other procedures in accordance with the external name registration table and storing the foreign language procedure and the other procedures into the main memory so that the foreign language procedure can be used to call the interpreter function by way of the compiler language procedure. An interpreter language procedure generating means is provided for generating an interpreter language procedure for operating the foreign language procedure and storing the interpreter language procedure into the main memory.

Interpreter language functions can therefore be called from within a compiler language procedure in the same process as the latter calls a compiler language procedure. In addition, the memory can be utilized to the fullest extent as the resource management of the operating system would permit. The method of the invention is independent on the management of storage areas of the memory occupied by the object file, and thus no overhead problem occurs. Furthermore, there is no need for the user to pay attention to the location or area name of the object file.

BRIEF DESCRIPTION OF THE DRAWINGS

The present invention will be described in further detail with reference to the accompanying drawings, in which.

DETAILED DESCRIPTION

Figure 1:
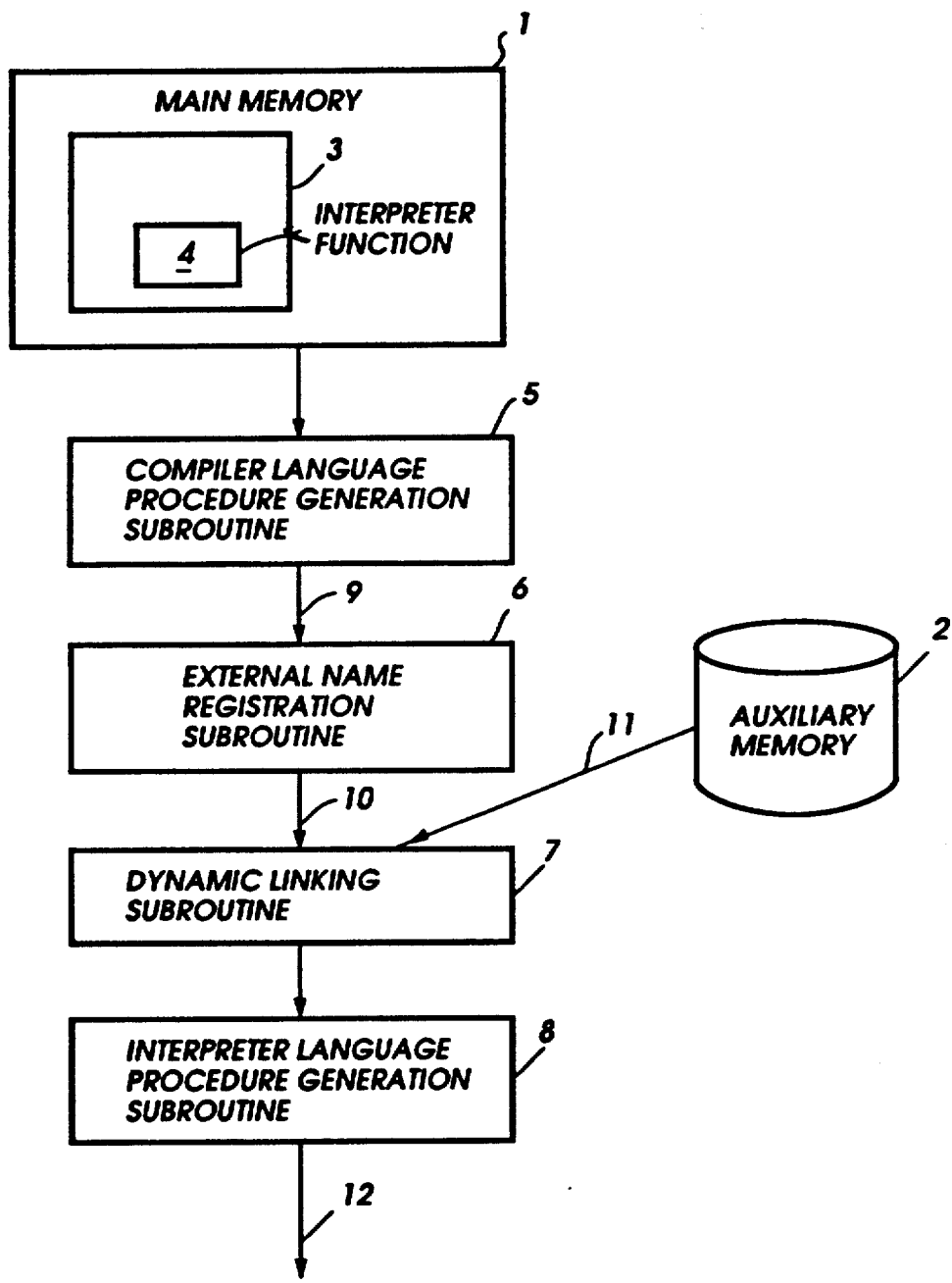
FIG. 1 is a block diagram of an interpreter system of the present invention that allows an interpreter language procedure to be called from within a compiler language procedure.

Referring now to FIG. 1, there is shown an interpreter system according to a preferred embodiment of the present invention in which an interpreter 3 having a user-defined interpreter function 4 is shown loaded into a main storage device 1 to be executed.

A compiler language procedure generation subroutine 5 is provided to permit the user to invoke the interpreter function 4 from a procedure prepared in the compiler language. A compiler language procedure 9 is supplied from the subroutine 5 and applied to an external name registration subroutine 6. A dynamic linking subroutine 7 is responsive to the output of the external name registration subroutine 6 as well as to the output of an auxiliary storage device 2. Dynamic linking subroutine 7 is invoked in response to a name of an object file which contains a foreign language procedure 11 supplied from the auxiliary storage device 2 to reference to the interpreter function 4. The foreign language procedure 11 from the auxiliary storage device 2 is loaded into the main storage device 1 and the reference to the interpreter function 4 is made by reference to the compiler language procedure 9 supplied from the compiler language procedure generation subroutine 5.

An interpreter procedure generation subroutine 8 is associated with the results of dynamic linking subroutine 7 to produce an interpreter language procedure 12 which is seen as an interpreter function as viewed from the interpreter side of the system. When the user invokes this function, control is shifted to the foreign language procedure 11 supplied from the auxiliary storage device 2 and the interpreter function 4 can be invoked in that control by way of the procedure 9 from the compiler language procedure generation subroutine 5. Control is then returned to the point where the interpreter language procedure 12 has been invoked.

Figure 2:
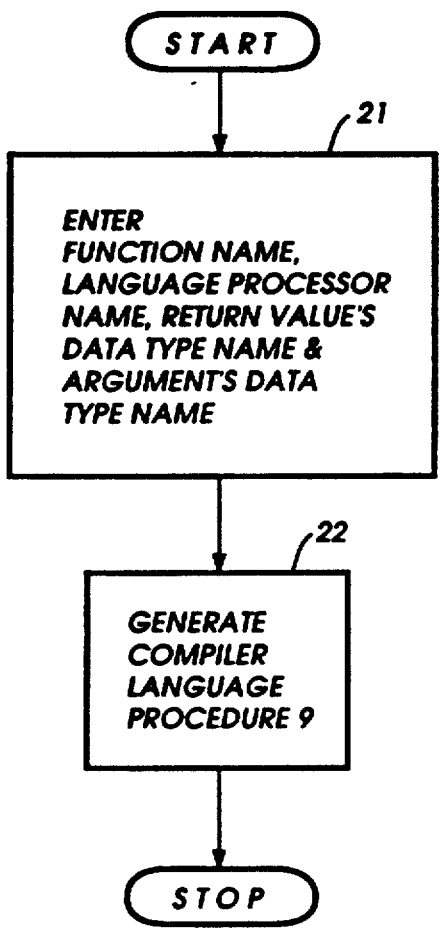
FIG. 2 is a flowchart showing a process of preparing a compiler language procedure.
Figure 3:
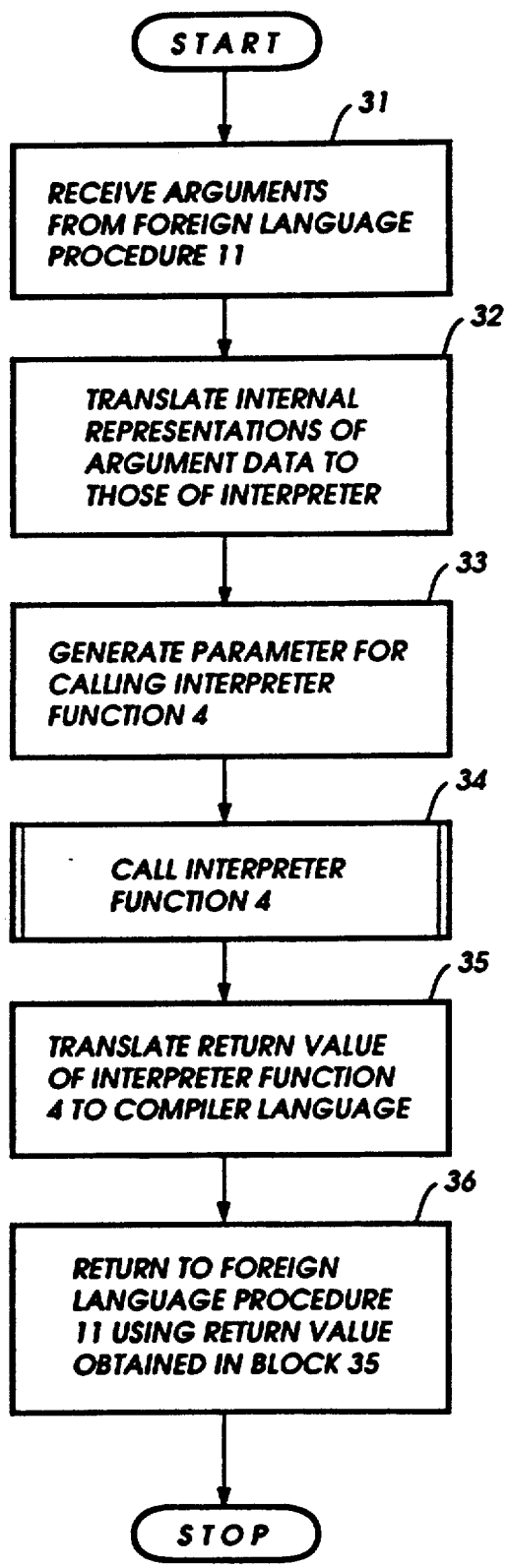
FIG. 3 is a flowchart showing a series of instructions generated by the compiler language procedure of FIG. 2.

As shown in FIG. 2, the compiler language procedure generation subroutine 5 comprises a step 21 for entering a set of four information items including the name of an interpreter function 4, the language name of the foreign language procedure 11 which is used to call the interpreter function 4, the return value's data type name of interpreter function 4, and the data type name of each argument. In addition, the data type names of return value can be dispensed with if a procedure having no return value is called. In step 22, compiler language procedure 9 is prepared to produce a series of instructions as shown in FIG. 3. In FIG. 3, program execution starts with operations block 31 which directs the receiving of a foreign language procedure 11 from the auxiliary storage device 2. Exit then is to operations block 32 which directs the translating of the internal representations of argument data to those of the interpreter. Control exits to operations block 33 which generates a calling parameter of the interpreter function 4. Exit then is to operations block 34 in which the interpreter function 4 is called. Block 35 is then executed by translating the return value of the interpreter function 4 to the internal representation of the compiler language. Finally, control advances to operations block 36 in which it returns to the foreign language procedure 11 in the main storage device 1 in accordance with the return value obtained in block 35.

Figure 4:
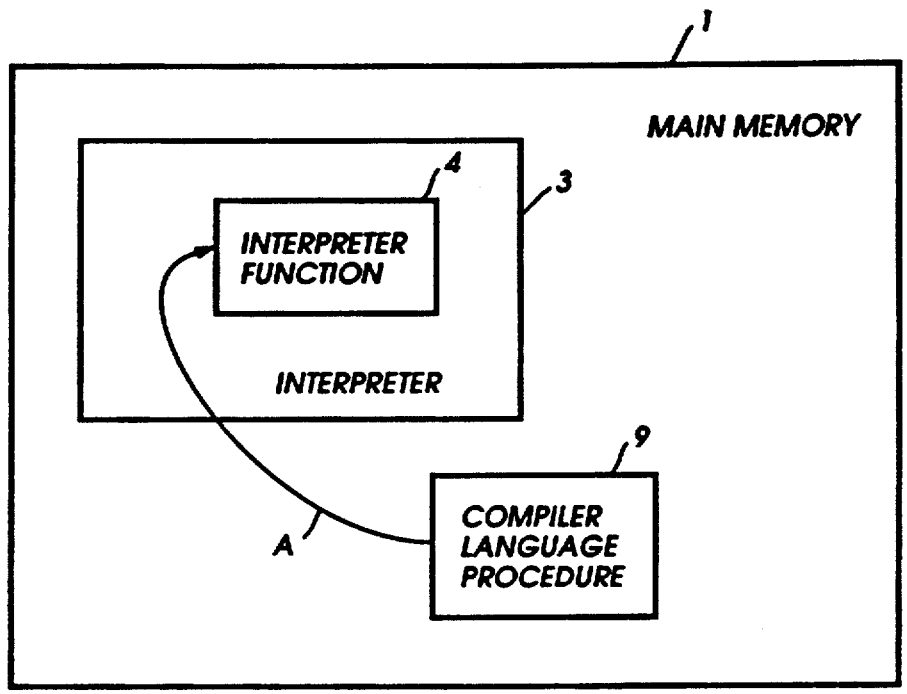
FIG. 4 is an illustration of the internal state of the main memory at the time when a compiler language procedure is stored into the memory.

When the compiler language procedure generation subroutine 9 is prepared, it is written into the main storage device 1 and linked with the interpreter function 4 as indicated by an arrow A in FIG. 4 to permit control to be passed from the compiler language procedure 9 to the interpreter function 4.

Figure 5:
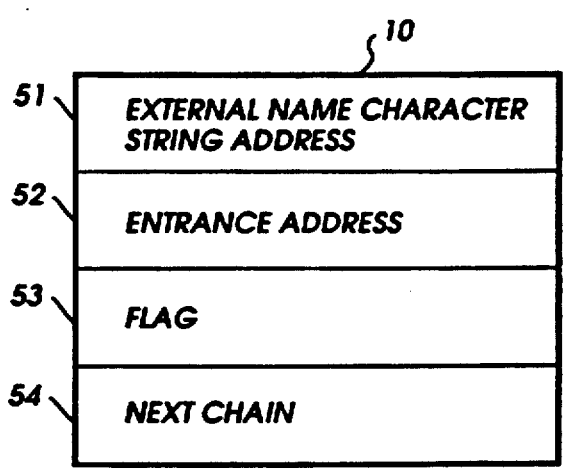
FIG. 5 is a view of the external name registration table.
Figure 6:
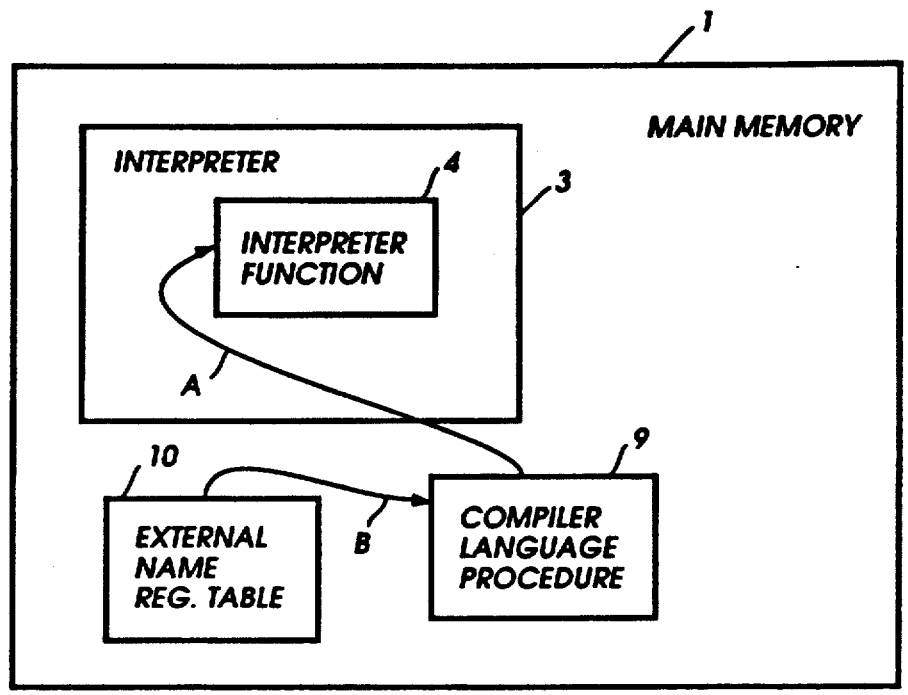
FIG. 6 is illustration of the internal state of the main memory at the time when an external name registration table is stored into the memory.

The external name registration subroutine 6 is then automatically activated to prepare an external name registration table 10 which will be used in the dynamic linking subroutine 7. As shown in FIG. 5, the external name registration table 10 comprises four entries 51 through 54. In top row 51, external name character string addresses are stored to identify the location in which the name of an external procedure is saved. In the second row 52 is stored an entrance address which identifies the entry point of the external procedure. In the third and fourth rows 53 and 54, a flag and next chain information are respectively stored. The flag indicates that the external procedure has been defined and the chain information is used to make a search for an element in the external name registration table 10 to link it with the external procedure. When the registration subroutine 6 is finished, the external name registration table 10 is stored into the main storage device 1 with a link B extending to the compiler language procedure 9 as shown in FIG. 6.

Figure 7:
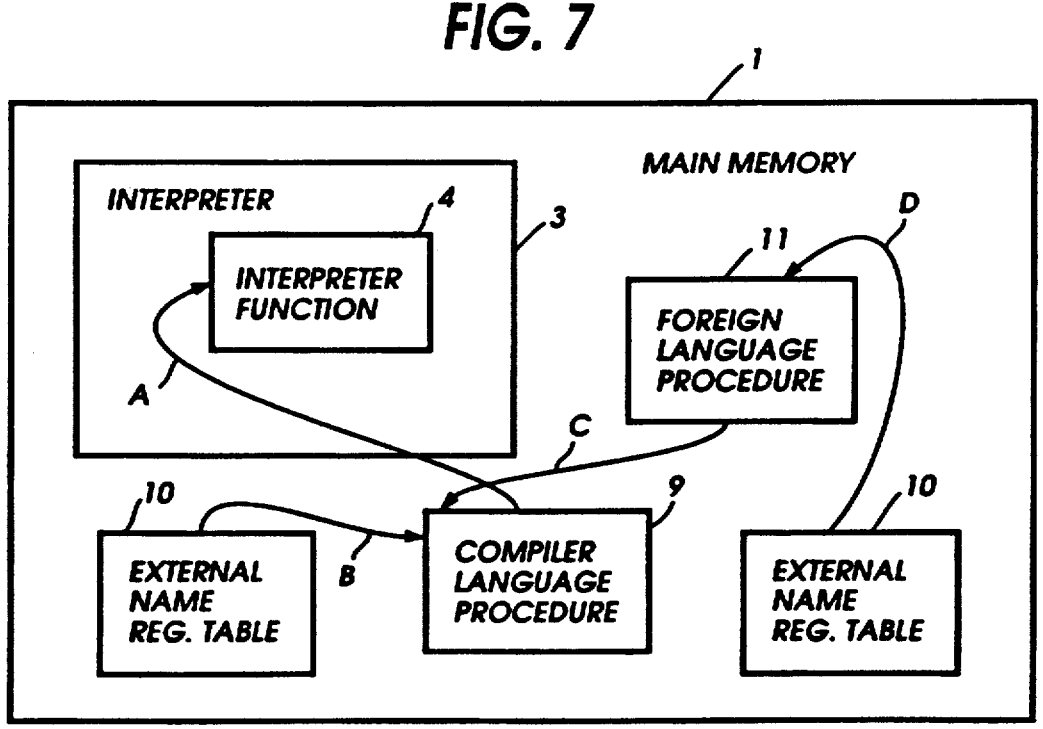
FIG. 7 is an illustration of the internal state of the main memory at the time when a foreign language procedure is stored into the memory.

Next, the user activates the dynamic linking subroutine 7 by entering an object file name from the auxiliary storage device 2 which contains the foreign language procedure 11 that refers to the interpreter function 4. Using the external name registration table 10, all the references to the foreign language procedure 11 and all the procedures contained in the object file are resolved, rearranged and stored into the main storage device 1 as a foreign language procedure 11 with a link C extending to the compiler language procedure 9 and a link D coming from the external name registration table 10 as shown in FIG. 7. While this subroutine is similar to the known static linker, it differs from the known method by the inclusion of the external name registration table 10. Thus, the dynamic linking subroutine 7 not only handles the external names resident in the object file, but also handles the external names known from the external name registration table 10 which is now resident in the main storage device 1. As a result, by repeating the dynamic linking subroutine 7 a few times, the area of the external procedure can be expanded in so far as the system would permit.

With the dynamic linking subroutine 7 being finished, the foreign language procedure 11 in the main storage device 1 is now able to call the interpreter function 4 by way of the compiler language procedure 9.

At this moment, control is now resident within the interpreter 3, which can be directly passed to the foreign language procedure 11 from a procedure within the interpreter 3, or indirectly from another foreign language procedure 11 to which control has been passed from the interpreter. In either case, the known technique can be used.

Figure 8:
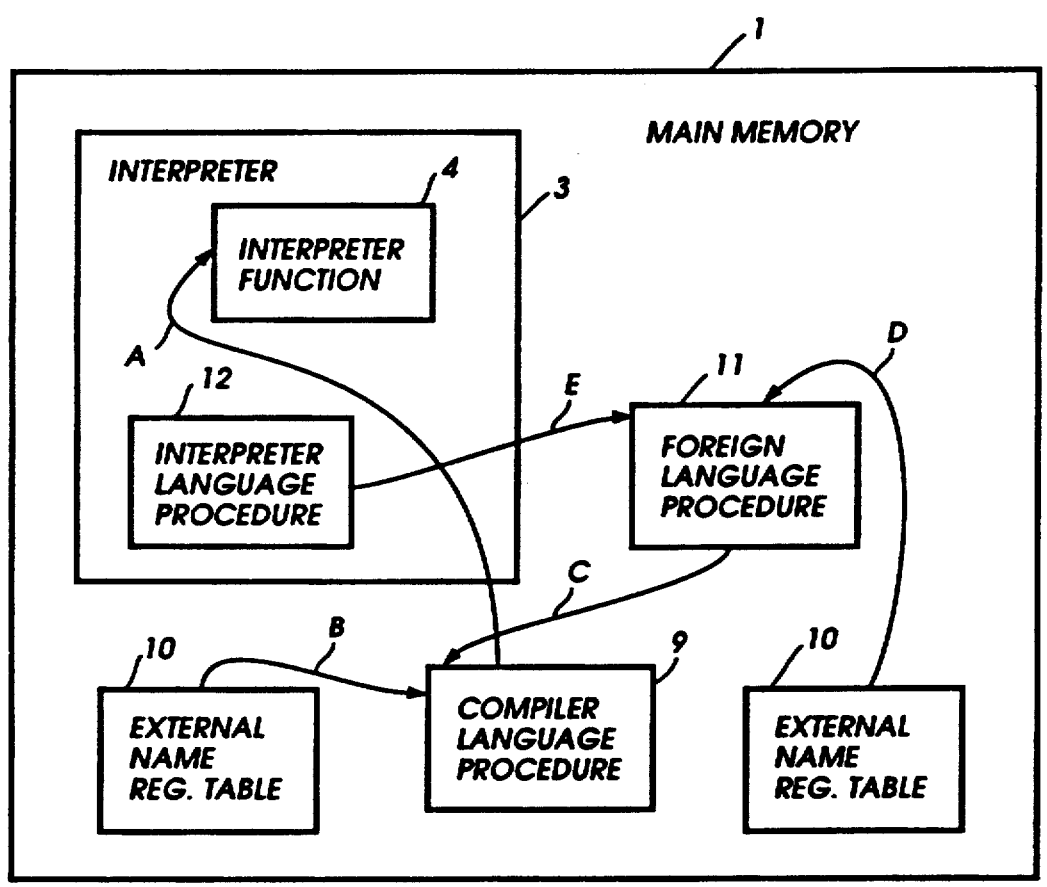
FIG. 8 is an illustration of the internal state of the main memory at the time when an interpreter language procedure is stored into the memory.

The execution of the interpreter language procedure generation subroutine 8 involves the use of a well known process which is inverse to that of the compiler language procedure generation subroutine 5. The interpreter language procedure 12 prepared by the subroutine 8 is loaded into the main storage device 1 with a link E extending to the foreign language procedure 11 to permit control to be passed to it from the interpreter 3 as shown in FIG. 8.

As described above, by the use of a dynamic linker, references made by a compiler language procedure to the own language procedures can be resolved, and interpreter language functions can be called from within a compiler language procedure in the same process as the latter calls a compiler language procedure. In addition, the present invention permits the main storage device 1 to be utilized as the resource management of the operating system would permit. Since the algorithm of the present invention is independent on the storage area occupied by the foreign language procedure 11, or object file, no overhead problem occurs and there is no need for the user to pay attention to the location or area name of the foreign language procedure 11.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An interpreter system comprising:
   a main memory in which an interpreter function is stored;
   an auxiliary memory for storing an object file containing a foreign language procedure and a plurality of other procedures;
   compiler language procedure generating means coupled to said main memory for generating a compiler language procedure in said main memory in accordance with a function name of said interpreter function, a name of said foreign language procedure for calling said interpreter function, a return data type name of said interpreter function and an argument data type name, said compiler language procedure being linked to said interpreter function;
   external name registration means responsive to the generation of said compiler language procedure for generating in said main memory an external name registration table containing data for addressing said foreign language procedure and said compiler language procedure;
   first dynamic linking means operable in response to the generation of said external name registration table for reading said object file from said auxiliary memory and the contents of said external name registration table;
   second dynamic linking means responsive to said first dynamic linking means reading said object file and said contents of said external name registration table for establishing reference relationships between said foreign language procedure and said plurality of other procedures in accordance with said external name registration table;
   third dynamic linking means responsive to said second dynamic linking means establishing said reference relationships for transferring said foreign language procedure and said other procedures from said auxiliary memory to said main memory, and linking said transferred procedures to said compiler language procedure and to said external name registration table; and
   interpreter language procedure generating means for generating an interpreter language procedure in said main memory and linking the interpreter language procedure to said foreign language procedure;
   whereby the transferred procedures are able to call said interpreter function by way of said compiler language procedure.

* * * * *